United States Patent
Dooley et al.

(10) Patent No.: US 7,108,311 B2
(45) Date of Patent: Sep. 19, 2006

(54) METHOD OF FORMING A VEHICLE PANEL ASSEMBLY

(75) Inventors: David J. Dooley, Troy, MI (US); Alan G. Dry, Grosse Pointe Woods, MI (US); Thomas W. Spanos, Chesterfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/376,043

(22) Filed: Feb. 28, 2003

(65) Prior Publication Data

US 2004/0169396 A1    Sep. 2, 2004

(51) Int. Cl.
B60J 5/00    (2006.01)

(52) U.S. Cl. .................. 296/146.7; 264/46.4; 264/275; 264/279

(58) Field of Classification Search ............. 296/146.7; 264/46.4, 46.8, 275, 279
See application file for complete search history.

(56) References Cited

U.S. PATENT DOCUMENTS

| | | | |
|---|---|---|---|
| 4,869,543 A | | 9/1989 | Grimes |
| 5,582,789 A | * | 12/1996 | Stein et al. ................. 264/46.4 |
| 5,626,382 A | | 5/1997 | Johnson et al. |
| 5,811,053 A | * | 9/1998 | Ota et al. .................... 264/511 |
| 5,868,455 A | | 2/1999 | Springer et al. |
| 5,919,324 A | * | 7/1999 | Moffitt et al. ............... 264/46.4 |
| 6,090,336 A | * | 7/2000 | Hirmer et al. ............... 264/511 |
| 6,210,613 B1 | | 4/2001 | Stein et al. |
| 6,213,538 B1 | | 4/2001 | Scheidmantel et al. |
| 6,248,205 B1 | | 6/2001 | Scheidmantel et al. |
| 6,391,232 B1 | | 5/2002 | Fritsch |
| 6,426,130 B1 | | 7/2002 | Jones et al. |
| 6,616,216 B1 | * | 9/2003 | Furuyama et al. ........ 296/146.7 |
| 6,673,296 B1 | * | 1/2004 | Hiraiwa et al. ............. 264/275 |
| 2001/0008668 A1 | | 7/2001 | Jones et al. |
| 2002/0066972 A1 | | 6/2002 | Fritsch |
| 2002/0121714 A1 | | 9/2002 | Preisler |
| 2002/0121718 A1 | | 9/2002 | Winget et al. |
| 2002/0121723 A1 | | 9/2002 | Preisler et al. |
| 2003/0165664 A1 | * | 9/2003 | Carroll et al. .............. 428/138 |
| 2003/0189271 A1 | * | 10/2003 | Kieltyka et al. ............ 264/255 |

FOREIGN PATENT DOCUMENTS

| | | |
|---|---|---|
| EP | 1 160 070 | 12/2001 |
| FR | 2816543 | 5/2002 |
| GB | 1 417 631 | 12/1975 |
| JP | 2003 112327 | 4/2003 |

* cited by examiner

*Primary Examiner*—Jason Morrow
(74) *Attorney, Agent, or Firm*—MacMillan, Sobanski & Todd, LLC

(57) ABSTRACT

A method of manufacturing a laminated vehicle trim panel includes initially positioning a flexible first material within a mold cavity of a first mold portion. A second mold portion for closing the cavity of the first mold portion is then provided. A second material is introduced into the mold cavity to form a substrate, such that the substrate and the first material form a laminated vehicle trim panel. A portion of the substrate between the outer peripheral edge of the substrate and a second portion of the substrate defines a brim. The brim has a mounting feature for attaching the laminated vehicle trim panel to a second panel.

2 Claims, 4 Drawing Sheets

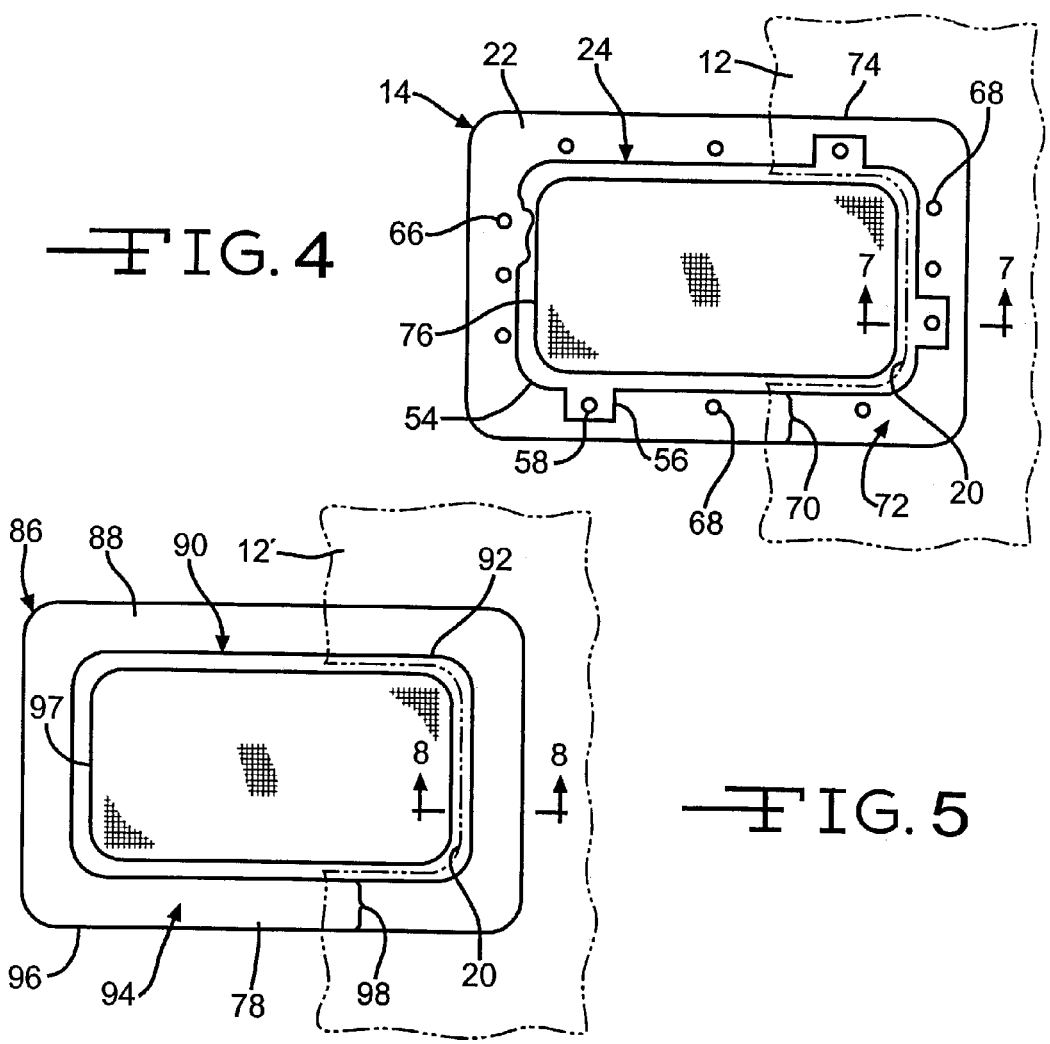
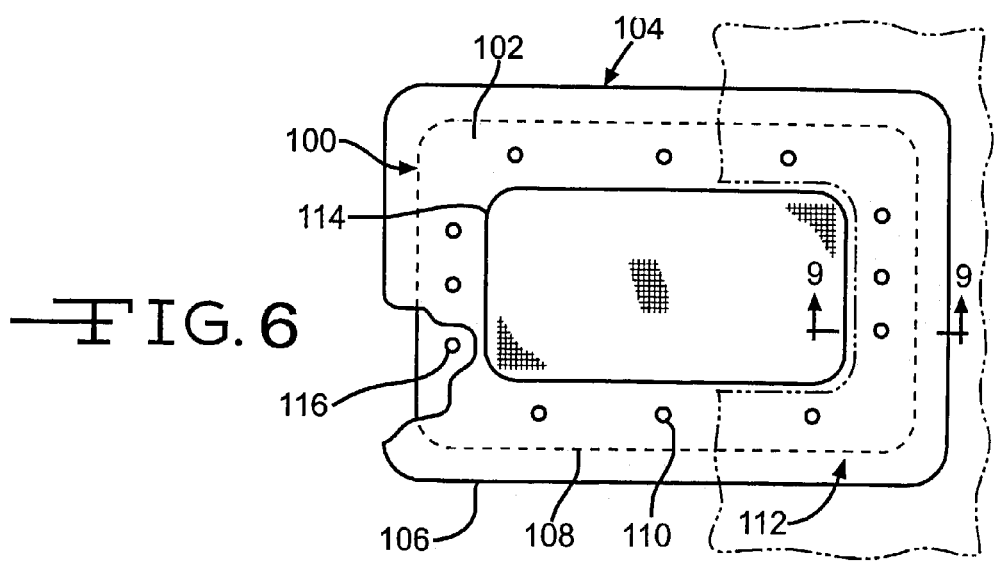

METHOD OF FORMING A VEHICLE PANEL ASSEMBLY

TECHNICAL FIELD

This invention relates to interior vehicle trim panels. More particularly, the invention relates to an improved method of manufacturing an interior vehicle trim panel.

BACKGROUND OF THE INVENTION

It is known to provide an interior trim panel for a vehicle which is aesthetically and/or tactilely pleasing to the vehicle occupants. Such trim panels commonly have cushioned soft-touch aesthetic features. In particular, interior vehicle door panels often include a bolster area having such cushioned soft-touch aesthetic features. Such localized softness in a bolster area may be provided by a cover, such as flexible fabric or vinyl material of varying thickness typically mounted to a rigid structural substrate to form a bolster panel.

It is also known to form bolster panels using in-mold lamination. However, such bolster panels often require several post-molding assembly operations, including trimming excess cover material or folding and securing excess cover material to a back side of the bolster panel. Holes for receiving components, such as armrests, door latches, and thermoplastic stakes, must then be provided, such as by punching. Such known methods of manufacturing vehicle bolster panels therefore typically require a series of separate molding and assembly steps which can add significant cost to each part produced. It would therefore be desirable to provide an improved method of manufacturing an interior bolster panel for a vehicle.

SUMMARY OF THE INVENTION

This invention relates to an improved method of manufacturing a laminated vehicle trim panel. Initially, a flexible first material is positioned within a mold cavity of a first mold portion. A second mold portion for closing the cavity of the first mold portion is then provided. A second material is introduced into the mold cavity to form a substrate, such that the substrate and the first material form a laminated vehicle trim panel. A portion of the substrate between the outer peripheral edge of the substrate and a second portion of the substrate defines a brim. The brim has a mounting feature for attaching the laminated vehicle trim panel to a second panel.

In one embodiment of the method of manufacturing a laminated vehicle trim panel according to the invention, the mounting feature of the brim includes an aperture.

In an alternate embodiment of the method of manufacturing a laminated vehicle trim panel according to the invention, the mounting feature of the brim includes a substantially flat weld surface.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is a plan view of a first embodiment of a vehicle trim panel manufactured in accordance with the method of this invention.

FIG. 5 is a plan view of a second embodiment of a vehicle trim panel manufactured in accordance with the method of this invention.

FIG. 6 is a plan view of a third embodiment of a vehicle trim panel manufactured in accordance with the method of this invention.

DETAILED DESCRIPTION OF THE INVENTION

Figure 1:
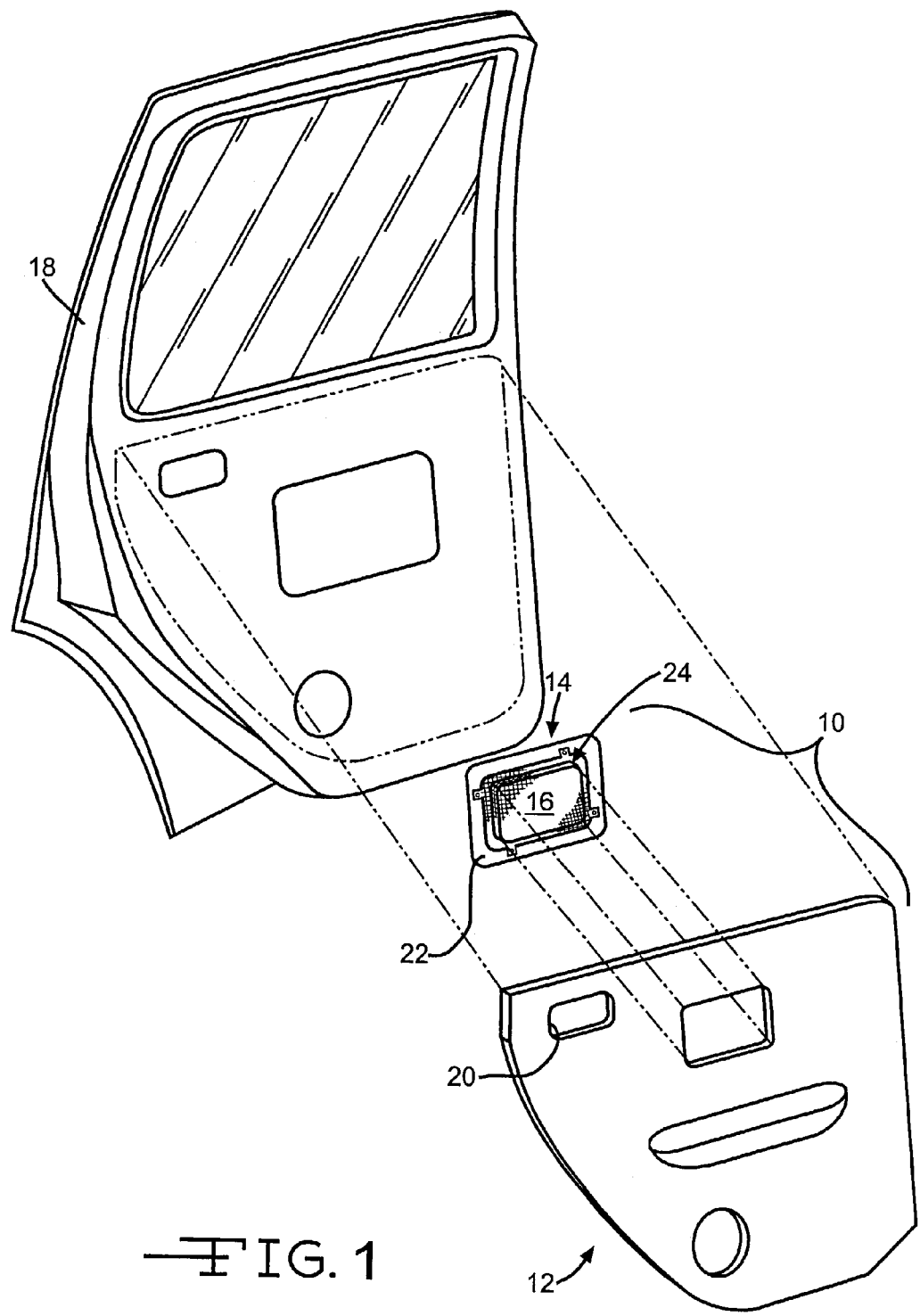
FIG. 1 is an exploded perspective view of a vehicle door assembly showing a vehicle trim panel manufactured in accordance with the method of this invention.

Referring now to the drawings, there is illustrated in FIG. 1 a vehicle trim panel assembly, generally shown at 10. The trim panel assembly 10 comprises a trim component or panel 12 formed from any desired material. Preferably, the trim panel assembly 10 also includes a bolster or laminated vehicle trim panel 14 which defines an accent region 16. The trim panel assembly 10 of the exemplary embodiment is an automotive door assembly 10 which mounts to a vehicle door, generally shown at 18. The door assembly 10 may be attached to the vehicle door 18 by suitable fasteners (not shown) as is well known in the art. The laminated vehicle trim panel 14 of the exemplary embodiment is a laminated panel 14 which mounts to a door trim panel 12.

It will be appreciated however, that the trim panel 12 of the subject invention may be any type of trim panel associated with a vehicle. For example, other types of trim panels include trunk panels, quarter panels, rear package trays, headliners, instrument panels, garnish moldings, and console panels, among others. It will also be appreciated that the laminated vehicle trim panel 14 may be any type of trim panel associated with a vehicle. For example, the laminated vehicle trim panel 14 may be a panel for mounting to any of a trunk panel, a quarter panel, a rear package tray, a headliner, an instrument panel, a garnish molding, and a console panel, and the like.

The door trim panel 12 is preferably formed of a molded plastic material such as polypropylene, polyethylene, or acrylonitrile-butadiene-styrene (ABS). As appreciated by those skilled in the art, the door trim panel 12 may be fabricated of other materials, such as wood fibers, polyurethane, solid molded vinyl, expanded polyurethane foam, any combination thereof, or any other suitable rigid material. A trim panel opening 20 is preferably formed in the door trim panel 12.

Figure 3:
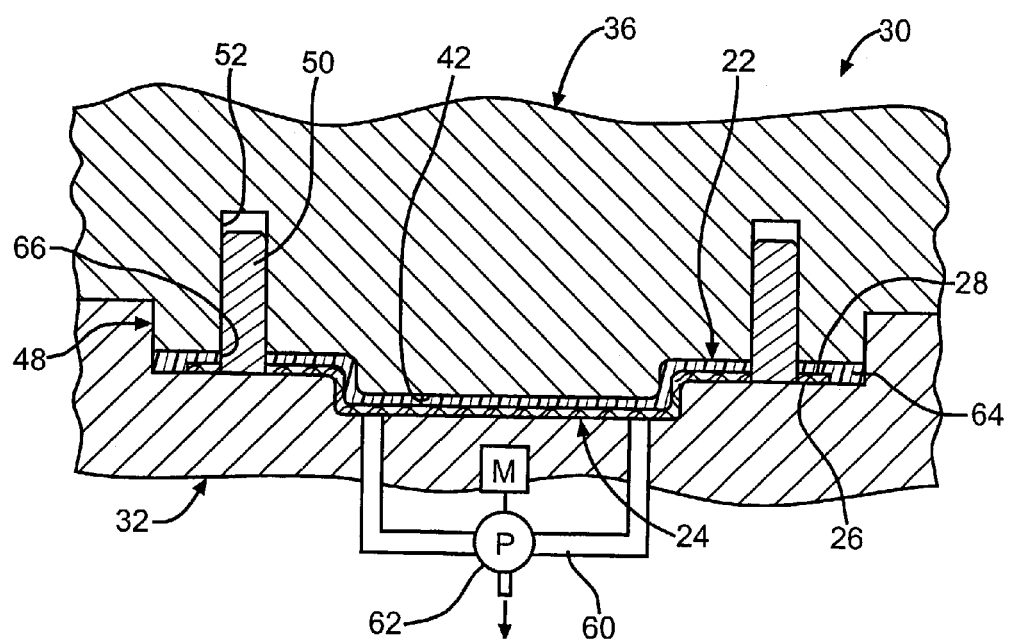
FIG. 3 is a cross sectional elevational view of the mold assembly illustrated in FIG. 2, showing the mold assembly in a closed position.

An exterior surface of the laminated vehicle trim panel 14 preferably includes a decorative surface portion, such as the accent region 16. As best shown in FIGS. 3 and 4, and as will be described in detail herein, the laminated vehicle trim panel 14 includes a substrate 22 covered with a flexible first material 24. The flexible first material 24 includes a decorative or front surface 26 and a back surface 28. The first material 24 is preferably formed from a decorative trim material such as fabric, vinyl, leather, and/or carpeting.

Figure 2:
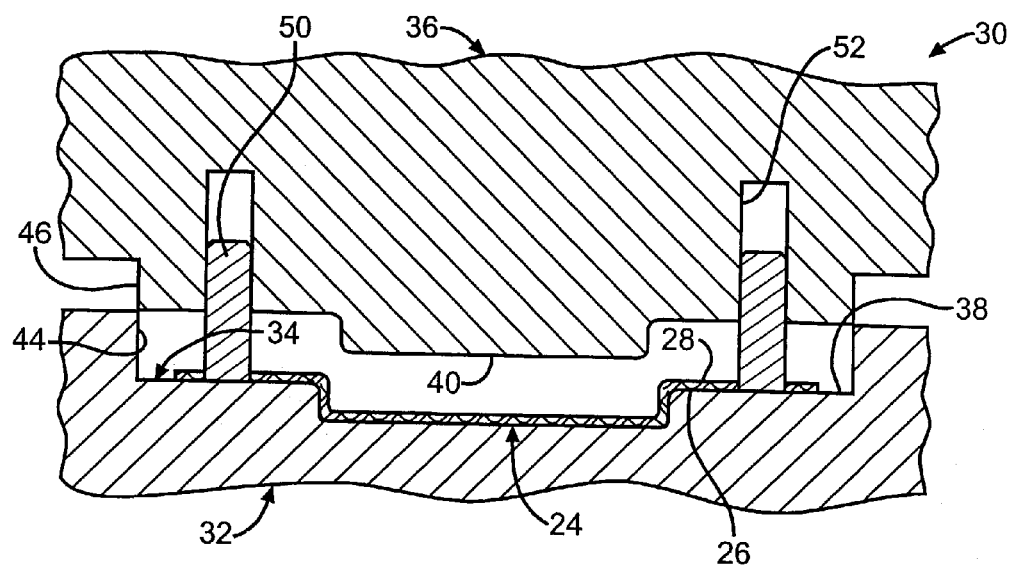
FIG. 2 is a cross sectional elevational view illustrating a mold assembly used in accordance the method of this invention, showing the mold assembly in an open position.

Referring now to FIG. 2, there is illustrated a mold assembly, indicated generally at 30, which is adapted to be used in accordance with the method of this invention. The mold assembly 30 is shown in an open position and preferably includes a first mold portion 32 having a mold cavity 34 and a second mold portion or mold core 36. The mold cavity 34 includes a cavity surface 38, and the mold core 36 includes core surface 40. Although illustrated schematically in FIGS. 2 and 3, it will be appreciated that the surfaces 38 and 40 may be of any desired shape and contour. For example, the first mold portion 32 might be a mold core, and the second mold portion 36 might be a corresponding mold cavity.

The first mold portion 32 and the mold core 36 are preferably mounted to platens (not shown) of a press (not shown), such as a vertical molding press with sufficient tonnage to accomplish the method herein described. When the mold assembly 30 is in a closed position, as shown in FIG. 3, the first mold portion 32 and the mold core 36 form a mold assembly cavity 42.

Additionally, when the mold assembly 30 is in the closed position, a parting surface 44 of the first mold portion 32, and a parting surface 46 of the mold core 36, defines a parting line 48.

The first mold portion 32 preferably includes at least one first pin 50 extending outward of the cavity surface 38. When the mold assembly 30 is in the closed position, the first pin 50 preferably extends into a pin-receiving cavity 52 formed in the core surface 40.

It will be appreciated, that in accordance with each embodiment of the invention, as will be described below, a first step of the method of the invention includes providing a suitable mold assembly, such as the mold assembly 30.

A second step of the method of this invention is illustrated generally at FIG. 2. In the second step, the mold core 36 is moved upwardly, as viewed in FIG. 2, thereby moving the mold assembly 30 into the open position. The first material 24 is then positioned in the mold cavity 34, such that the front surface 26 of the first material 24 contacts the cavity surface 38. Preferably, the first material 24 has a predetermined shape such that the first material 24 will have no excess material, and therefore will not require a post-molding operation, such as cutting or trimming. As shown in FIG. 4, the first material 24 has an outer peripheral edge 54 and includes at least one tab 56. A pin hole 58 is formed in the tab 56. Preferably, the first material 24 is positioned and secured within the mold cavity 34 by placing each pin hole 58 about a corresponding first pin 50 in the mold cavity 34.

In an alternate embodiment of the method according to the invention, the first material 24 can be secured within the mold cavity 34 by a vacuum, such as provided in a known vacuum-form mold. Preferably, a plurality of vacuum channels 60, as shown in FIG. 3, are formed in the cavity surface 38 of the first mold portion 32 and are connected to a source of vacuum 62. It will be appreciated that the vacuum channels 60 can be formed in any desired location and any desired arrangement in the cavity surface 38. Preferably, a vacuum is applied through the vacuum channels 60 to draw the first material 24 into conformity with the cavity surface 38.

A third step of the method of this invention is illustrated generally at FIG. 3. In the third step, the mold core 36 is moved downwardly, as viewed in FIG. 3, thereby moving the mold assembly 30 into the closed position. A second material 64 is then introduced into the mold assembly cavity 42. The second material 64 can be any desired material. Preferably the second material 64 is molten plastic, such as polypropylene, polyethylene, or acrylonitrile-butadiene-styrene (ABS).

As shown in FIG. 3, the mold assembly cavity 42 is filled with the second material 64. The second material 64 then conforms to the shape of the mold assembly cavity 42, thereby forming the substrate 22. Preferably, the substrate 22 becomes mechanically bonded to the first material 24 as the melted second material 64 hardens during the molding process to form the laminated vehicle trim panel 14. However, such mechanical bonding is not required. As shown in FIG. 4, the first pins 50 also define a plurality of first apertures or holes 66 in the substrate 22.

If desired, the mold assembly 30 can be provided with a plurality of second pins (not shown) for forming a plurality of second apertures or holes 68 in a mounting region 70 of the laminated vehicle trim panel 14, although such second holes 68 are not required. Preferably, as best shown in FIG. 4, the second holes 68 are formed in a brim 72 of the laminated vehicle trim panel 14. The laminated vehicle trim panel 14 is then removed from the mold assembly 30 by any desired method (not shown).

The brim 72 is defined as a portion of the substrate 22 between an outer peripheral edge 74 of the substrate 22 and a second portion of the substrate 22. Preferably, the second portion of the substrate 22 is a contoured portion 76 of the substrate 22. The contoured portion 76 of the substrate 22 is defined by a shape or contour of the cavity surface 38 and the core surface 40. It will be appreciated however, that the second portion of the substrate 22 need not be a contoured portion, and the second portion can be any desired location inward of the outer peripheral edge 74 of the substrate 22. It will be further appreciated that the substrate 22 can be substantially flat, thereby having substantially no contour.

Preferably, the outer peripheral edge 54 of the first material 24 is inward of the outer peripheral edge 74 of the substrate 22. A portion of the brim 72 between the outer peripheral edge 54 of the first material and an outer peripheral edge of the substrate 22 defines the mounting region 70. Preferably, the mounting region 70 of the brim 72 includes a mounting feature for attaching the laminated vehicle trim panel 14 to a second panel, such as the door trim panel 12.

Figure 7:
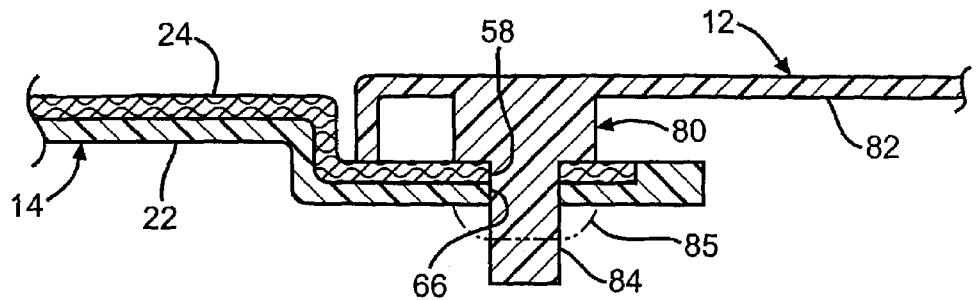
FIG. 7 is a cross sectional elevational view taken along line 7—7 of FIG. 4, showing the thermoplastic stake.
Figure 9:
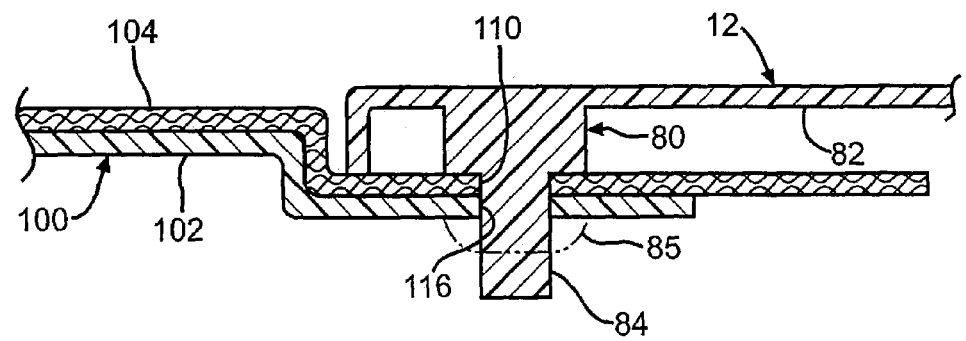
FIG. 9 is a cross sectional elevational view taken along line 9—9 of FIG. 6, showing the thermoplastic stake.

The mounting feature can include any desired mounting feature such as an the first and second holes 66 and 68, a substantially flat weld surface, such as a weld surface 78 shown in FIG. 5, or a thermoplastic stake 80, as shown in FIGS. 7 and 9.

The laminated vehicle trim panel 14 is then disposed adjacent a back surface 82 of the door trim panel 12, such that the first material 24 is positioned within the opening 20. The mounting features of the mounting region 70 are positioned adjacent the back surface 82 of the trim panel 12 about the opening 20.

The laminated vehicle trim panel 14 is then attached to the trim panel 12 by any desired method. Preferably, as best shown in FIG. 7, a fastener, such as the thermoplastic stake 80, is inserted through the first and second holes 66 and 68, respectively, of the brim 72 for attaching the laminated vehicle trim panel 14 to the door trim panel 12. More preferably, the thermoplastic stake 80 is integrally formed on the back surface 82 of the door trim panel 12, such that a boss 84 of the stake 80 extends through the first hole 66. It will be appreciated that the thermoplastic stake 80 will be melted and reformed, as shown by a phantom line 85 in FIG. 7, so as to mechanically bond the laminated vehicle trim panel 14 to the door trim panel 12, thereby forming the door assembly 10. The thermoplastic stake 80 can be melted by any desired means, such as a heated aluminum platen (not shown).

An alternate embodiment of a laminated vehicle trim panel 86 manufactured according to the method of the invention is illustrated in FIG. 5. The laminated vehicle trim panel 86 includes a substrate 88 and a flexible first material 90. Preferably, the first material 90 has a predetermined shape such that the first material 90 will have no excess material, and therefore will not require a post-molding operation, such as cutting or trimming. As shown in FIG. 5, the first material 90 has an outer peripheral edge 92.

The method of forming the laminated vehicle trim panel 86 is substantially identical to the method of forming the laminated vehicle trim panel 14, except that the mold assembly (not shown) for forming the laminated vehicle trim panel 86 preferably has no pins. Preferably, the substrate 88 becomes mechanically bonded to the first material 90 as the melted second material 64 hardens during the molding process to form the laminated vehicle trim panel 86. However, such mechanical bonding is not required. The laminated vehicle trim panel 86 is then removed from the mold assembly by any desired method (not shown).

The laminated vehicle trim panel 86 preferably includes a brim 94 defined as a portion of the substrate 88 between the outer peripheral edge 96 of the substrate 88 and a second portion of the substrate 88. Preferably, the second portion of the substrate 88 is a contoured portion 97 of the substrate 88. It will be appreciated however, that the second portion of the substrate 88 need not be a contoured portion. The second portion can be any desired location inward of the outer peripheral edge 96 of the substrate 88. It will be further appreciated that the substrate 88 can be substantially flat.

Figure 8:
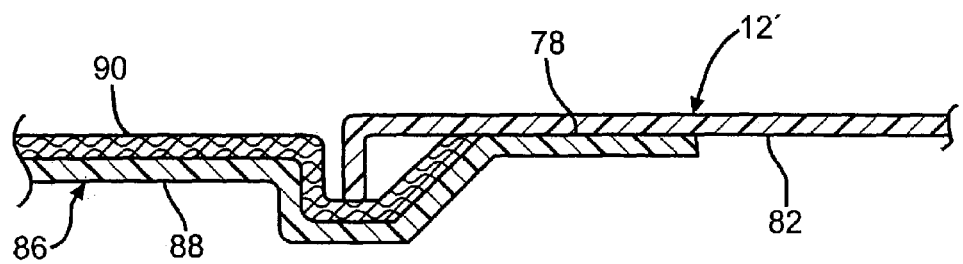
FIG. 8 is a cross sectional elevational view taken along line 8—8 of FIG. 5, showing a weld.

As shown in FIG. 5, a portion of the brim 94 between the outer peripheral edge 96 of the substrate 88 and the outer peripheral edge 92 of the first material 90 defines the mounting region 98. Preferably, the mounting region 98 of the brim 94 includes the substantially flat weld surface 78, as shown in FIG. 8, for attaching the laminated vehicle trim panel 86 to the door trim panel 12. The laminated vehicle trim panel 86 is then disposed adjacent the back surface 82 of the door trim panel 12', such that the first material 90 is positioned within the opening 20. As best shown in FIG. 8, the weld surface 78 is positioned adjacent the back surface 82 of the trim panel 12' about the opening 20. Preferably, the laminated vehicle trim panel 86 is then attached to the trim panel 12' by at least one sonic weld, thereby bonding the weld surface 78 of the laminated vehicle trim panel 86 to the back surface 82 of the door trim panel 12' and forming the door assembly 10. However, any other desired method of bonding the laminated vehicle trim panel 86 to the door trim panel 12' can be used.

Advantageously, in the exemplary embodiments illustrated in FIGS. 4 and 5, the first material 24 and 90 does not extend through or beyond the parting line 48 of the mold assembly 30. The mold assembly 30 is thereby provided with an improved seal at the parting line 48, relative to the seal provided in mold assemblies for trim panel manufacturing methods wherein first material does extend past the parting line of the mold assembly.

A second alternate embodiment of a laminated vehicle trim panel 100 manufactured according to the method of the invention is illustrated in FIG. 6. The laminated vehicle trim panel 100 includes a substrate 102 and a flexible first material 104. As shown in FIG. 6, the first material 104 has an outer peripheral edge 106. Preferably, the outer peripheral edge 106 of the first material 104 extends outward of the outer peripheral edge 108 of the substrate 102. At least one pin hole 110 is preferably formed in the first material 104 for positioning the first material 104 about a corresponding pin 50 in the mold cavity 34.

The method of forming the laminated vehicle trim panel 100 is substantially identical to the method of forming the laminated vehicle trim panel 14, and the laminated vehicle trim panel 100 is preferably formed in the mold assembly 30. Preferably, the substrate 102 becomes mechanically bonded to the first material 104 as the melted second material 64 hardens during the molding process to form the laminated vehicle trim panel 100. However, such mechanical bonding is not required. The laminated vehicle trim panel 100 is then removed from the mold assembly 30 by any desired method.

The laminated vehicle trim panel 100 includes a brim 112 defined as a portion of the substrate 102 between the outer peripheral edge 108 of the substrate 102 and a second portion of the substrate 102. Preferably, the second portion of the substrate 102 is a contoured portion 114 of the substrate 102. It will be appreciated however, that the second portion of the substrate 22 need not be a contoured portion 114, and the second portion can be any desired location inward of the outer peripheral edge 108 of the substrate 102. It will be further appreciated that the substrate 102 can be substantially flat, thereby having substantially no contour.

Preferably, the brim 112 defines mounting features for attaching the laminated vehicle trim panel 100 to the door trim panel 12. Preferably, the mounting features include holes 116, as shown in FIGS. 6 and 9, formed by the first pins 50 and the second pins. The mounting features can also include any other desired mounting feature. Preferably, the boss 84 of the thermoplastic stake 80, is inserted through the holes 116 of the brim 112 for attaching the laminated vehicle trim panel 100 to the door trim panel 12. It will be appreciated that the thermoplastic stake 80 will be melted and reformed, as shown by a phantom line 85 in FIG. 9, so as to mechanically bond the laminated vehicle trim panel 100 to the door trim panel 12, thereby forming the door assembly 10. The thermoplastic stake 80 can be melted by any desired means, such as a heated aluminum platen. The laminated vehicle trim panel 100 is otherwise formed in a manner similar to the laminated panel 14.

As shown in FIGS. 6 and 9, the outer peripheral edge 106 of the first material 104 extends beyond the parting line 48 of the mold assembly 30 during molding of the laminated vehicle trim panel 100. It will be appreciated that a hole 110, corresponding to each pin 50, must be formed in the first material 104 prior to positioning the first material 104 in the mold assembly 30.

It will also be appreciated that the laminated vehicle trim panels 14, 86, and 100 can be formed with any combination of holes for receiving thermoplastic stakes or other fasteners, and a weld surface for applying a weld, such as a sonic weld. For example, a portion of the brim can be formed with holes and a portion of the brim can be formed without holes so as to define a weld surface.

Advantageously, in the exemplary embodiments of the method illustrated in FIGS. 4, 5, and 6, and as described herein, secondary assembly operations are substantially reduced. For example, operations such as trimming or folding and securing excess cover material to a back side of the bolster panel, and punching holes for receiving components, such as armrests, door latches, and thermoplastic stakes, are not required.

The principle and mode of operation of this invention have been described in its preferred embodiments. However, it should be noted that this invention may be practiced otherwise than as specifically illustrated and described without departing from its scope.

What is claimed is:

1. A method of manufacturing a laminated vehicle trim panel comprising the steps of:
   a. positioning a flexible first material within a mold cavity of a first mold portion;
   b. forming a first hole in the flexible first material;
   c. providing a pin extending from a surface of the first mold portion, wherein the flexible first material is positioned within the mold cavity of the first mold portion, such that the pin extends through the first hole in the flexible first material, thereby retaining the flexible first material in the mold cavity;
   d. providing a second mold portion for closing the cavity of the first mold portion; and
   e. introducing a second material into the mold cavity to form a substrate, such that the substrate and the first material form a laminated vehicle trim panel;
   wherein a portion of the substrate between the outer peripheral edge of the substrate and a second portion of the substrate defines a brim;
   wherein an outer peripheral edge of the first material extends outward of the outer peripheral edge of the substrate; and
   wherein the brim includes an aperture aligned with the first hole in the flexible first material, such that the first hole and the aperture define a mounting feature for attaching the laminated vehicle trim panel to a second panel.

2. A method of manufacturing a vehicle trim panel comprising the steps of:
   a. positioning a flexible first material within a mold cavity of a first mold portion;
   b. forming a hole in the flexible first material;
   c. providing a pin extending from a surface of the first mold portion, wherein the flexible first material is positioned within the mold cavity of the first mold portion such that the pin extends through the hole;
   d. providing a second mold portion for closing the cavity of the first mold portion;
   e. introducing a second material into the mold cavity to form a substrate, such that the substrate and the first material form a laminated panel, wherein a portion of the substrate inwardly from an outer peripheral edge of the substrate defines a brim including an aperture aligned with the hole in the flexible first material;
   f. providing a panel having an opening formed therein and a stake extending outwardly from a back surface of the panel; and
   g. attaching the laminated panel to the back surface of the panel such that the stake extends through the hole of the first material and the aperture of the substrate.

* * * * *